(12) United States Patent
Lai (10) Patent No.: US 10,059,148 B2
(45) Date of Patent: Aug. 28, 2018

(54) HOLLOW WHEEL ASSEMBLY OF LUGGAGE

(71) Applicant: Wei-Hung Lai, Taichung (TW)

(72) Inventor: Wei-Hung Lai, Taichung (TW)

( * ) Notice: Subject to any disclaimer, the term of this patent is extended or adjusted under 35 U.S.C. 154(b) by 2 days.

(21) Appl. No.: 15/375,794

(22) Filed: Dec. 12, 2016

(65) Prior Publication Data

US 2018/0162160 A1 Jun. 14, 2018

(51) Int. Cl.
*B60B 33/00* (2006.01)
*A45C 5/14* (2006.01)

(52) U.S. Cl.
CPC ............ *B60B 33/0042* (2013.01); *A45C 5/14* (2013.01); *B60B 33/0002* (2013.01); *B60B 33/0028* (2013.01); *B60B 33/0047* (2013.01); *B60B 2200/45* (2013.01); *B60B 2900/115* (2013.01)

(58) Field of Classification Search
CPC ............ B63B 33/0042; B63B 33/0002; B63B 33/0028; B63B 33/0047; B63B 33/0049; B63B 33/0057; A45C 5/14; B60B 2200/45; B60B 2900/115; B62B 5/0083; Y10T 16/184; Y10T 16/1847; Y10T 16/1853; Y10T 16/1857
See application file for complete search history.

(56) References Cited

U.S. PATENT DOCUMENTS

| | | | | |
|---|---|---|---|---|
| 1,410,676 A | * | 3/1922 | Herold | ................ B60B 33/0028 16/45 |
| 3,977,040 A | * | 8/1976 | Sugasawara | ........ B60B 33/0028 16/26 |
| 4,706,329 A | * | 11/1987 | Screen | ................ B60B 33/0028 16/47 |
| 4,722,115 A | * | 2/1988 | Yang | .................... B60B 33/0028 16/45 |
| 5,394,589 A | * | 3/1995 | Braeger | .............. B60B 33/0028 16/44 |
| 5,873,145 A | | 2/1999 | Chou | |
| 6,322,156 B1 | | 11/2001 | Kuo | |
| 6,786,559 B1 | * | 9/2004 | Kidd | .................... A63C 17/223 16/18 R |
| 9,168,689 B2 | * | 10/2015 | Stoehr | ................... B60B 27/001 |
| 9,630,450 B1 | * | 4/2017 | Chang | ................ B60B 33/0039 |
| 9,669,658 B1 | * | 6/2017 | Tong | .................. B60B 33/0042 |
| 2004/0098830 A1 | * | 5/2004 | Tsai | ......................... B60B 7/02 16/47 |
| 2005/0081329 A1 | * | 4/2005 | Tsai | .................... B60B 33/0028 16/18 R |

(Continued)

FOREIGN PATENT DOCUMENTS

| | | |
|---|---|---|
| CN | 202727872 U | 2/2013 |
| CN | 103625211 A | 3/2014 |
| WO | 2007063302 A1 | 6/2007 |

*Primary Examiner* — Chuck Y Mah (74) *Attorney, Agent, or Firm* — Wang Law Firm, Inc.

(57) ABSTRACT

A hollow wheel assembly of a luggage includes a wheel mount, two wheel members, and a hollow shaft. The wheel mount has a shaft sleeve, in which the hollow shaft is received. The wheel members are connected to opposite ends of the hollow shaft for free rotation. The hollow shaft has a vision passage, and the wheel members have a plurality of vision bores, whereby one may see through the wheel members via the vision bores and the vision passages when the wheel members are rotating.

9 Claims, 10 Drawing Sheets

(56) References Cited

U.S. PATENT DOCUMENTS

| | | | | |
|---|---|---|---|---|
| 2007/0186373 A1* | 8/2007 | Melara | ............ | B60B 3/048 16/35 R |
| 2008/0163455 A1* | 7/2008 | Tsai | ............ | B60B 3/048 16/46 |
| 2011/0203074 A1* | 8/2011 | Trivini | ............ | B60B 33/0028 16/45 |
| 2011/0296649 A1* | 12/2011 | Hozumi | ............ | F16C 13/006 16/48 |
| 2012/0233809 A1* | 9/2012 | Lee | ............ | B60B 33/0039 16/45 |
| 2014/0283335 A1* | 9/2014 | Meersschaert | ............ | A45C 5/14 16/46 |
| 2015/0113766 A1* | 4/2015 | Hou | ............ | A45C 5/14 16/45 |
| 2017/0197463 A1* | 7/2017 | Chang | ............ | B60B 33/0028 |

\* cited by examiner

HOLLOW WHEEL ASSEMBLY OF LUGGAGE

BACKGROUND OF THE INVENTION

1. Technical Field

The present invention relates to a wheel assembly, and more particularly to a hollow wheel assembly of a luggage.

2. Description of Related Art

Luggage, so called wheeled luggage, is a case with a plurality of wheel assemblies on a bottom thereof for user may draw the luggage to walk. U.S. Pat. No. 5,873,145 disclosed a conventional wheel assembly of a luggage including a main seat, a wheel holder seat, and a wheel. The wheel is connected to the wheel holder seat by a pivot pin, so that the wheel is free to rotation.

U.S. Pat. No. 6,322,156 disclosed another conventional wheel assembly of a luggage, including a wheel, a wheel mount, an axle, a hollow cylindrical bearing, and a hollow shaft. The hollow shaft is inserted into the hollow cylindrical bearing, and then they are mounted in a bore of the wheel. Next, the wheel, together with the hollow shaft and the hollow cylindrical bearing, is mounted to the wheel mount with the axle inserted into the wheel mount and the hollow shaft to let the wheel rotate freely.

WO 2007063302 taught wheels for luggage items, in which the wheel includes a body, an inner support member, a bearing, and a tyre. The inner support member is fixedly connected to the body, the bearing is connected to an inner side of the inner support member, and the tyre is mounted to an outer surface of the bearing. As a result, the tyre and the bearing are free to rotate relative to the inner support member.

CN 202727872 disclosed a hollow wheel set, in which a hollow wheel is mounted in a hollow folk, and a bearing is provided between the hollow wheel and the hollow folk. As a result, the hollow wheel is rotatable.

There always is a bearing in the conventional wheel assemblies as described above. U.S. Pat. No. 6,322,156 provides the axle inserted into the wheel, so that there is no passage at a center of the wheel. WO 2007063302 and CN 202727872 each provides the wheel with a vision passage at a center thereof.

CN 103625211 taught another conventional wheel assembly of a luggage, in which a horizontally sliding axle is provided under a wheel bracket. A hollow pulley includes a tyre mounted on a pulley bracket, and is connected to the horizontally sliding axle. A decorative cover is mounted on the hollow pulley, and is fixed to the wheel bracket by a hook or a fixed pin. The hollow pulley is rotatable without a bearing, and it only has a vision passage at a center thereof.

BRIEF SUMMARY OF THE INVENTION

In view of the above, the primary objective of the present invention is to provide a hollow wheel assembly of a luggage, which has a vision passage through the wheel assembly.

The secondary objective of the present invention is to provide a hollow wheel assembly of a luggage, which has a structure without a bearing to simplify the structure.

In order to achieve the objective of the present invention, a hollow wheel assembly, which is adapted to be mounted on a bottom of a case of a luggage, includes a wheel mount, which is adapted to be connected to the case of the luggage, including a shaft sleeve with an assembling passage; two wheel members connected to opposite ends of the shaft sleeve respectively for free rotation; and a hollow shaft inserted into the assembling passage of the shaft sleeve, and having a vision passage passing through the hollow shaft in an axial direction thereof. The inner ring portion is provided with an assembling bore at a center thereof, and the shaft sleeve is inserted into the assembling bore. Opposite ends of the hollow shaft are abutted against the inner ring portions respectively. The outer wheel members are mounted on the outer ring portions of the inner wheel members respectively, whereby one may see through the wheel members via the vision passages when the wheel members are rotating.

In an embodiment, each of the wheel members includes a plurality of vision bores, and one may see through the wheel members via the vision bores as well as the vision passages when the wheel members are rotating.

The present invention provides the wheel assembly without a bearing to simplify the structure thereof.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
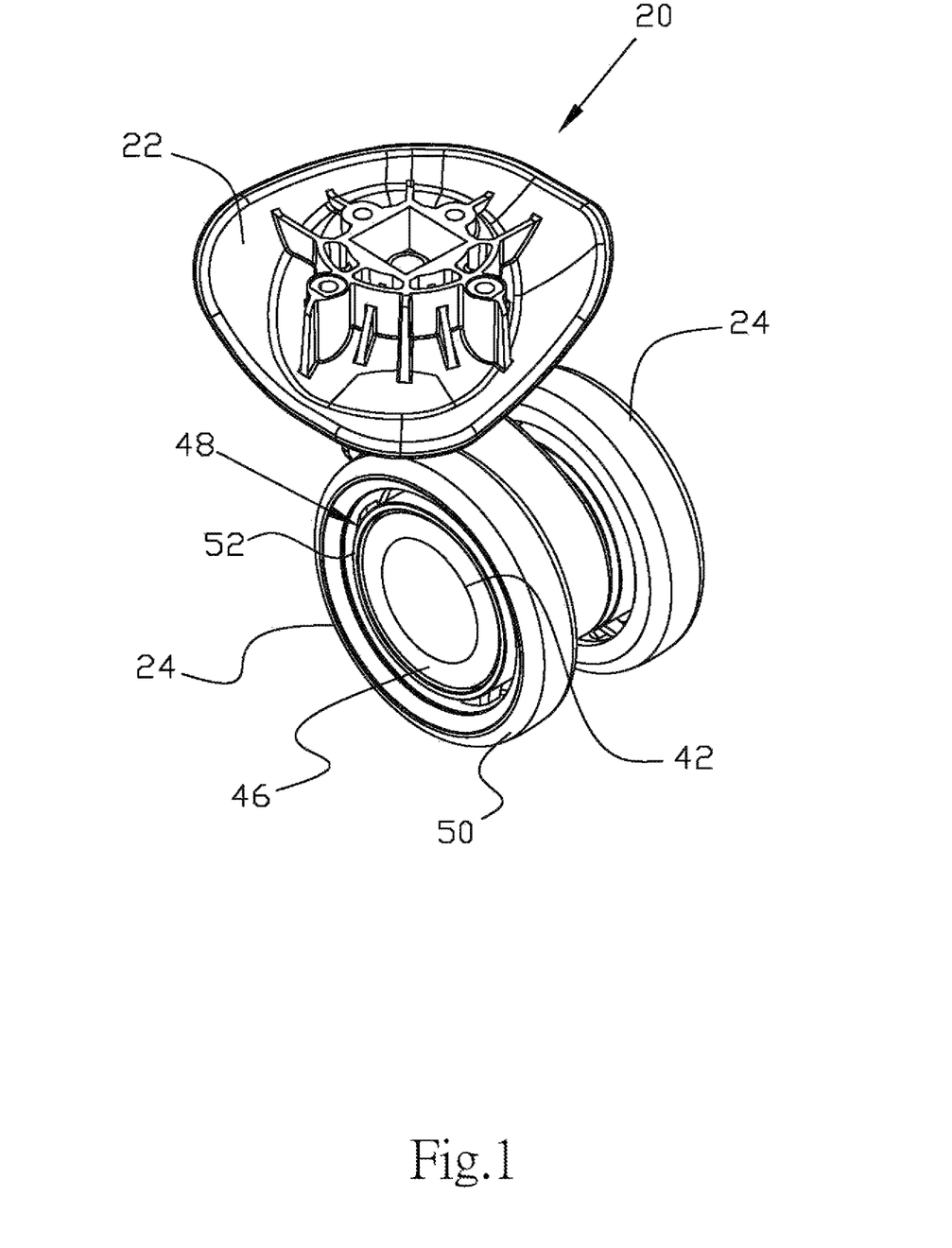
FIG. 1 is a perspective view of a first preferred embodiment of the present invention.
Figure 2:
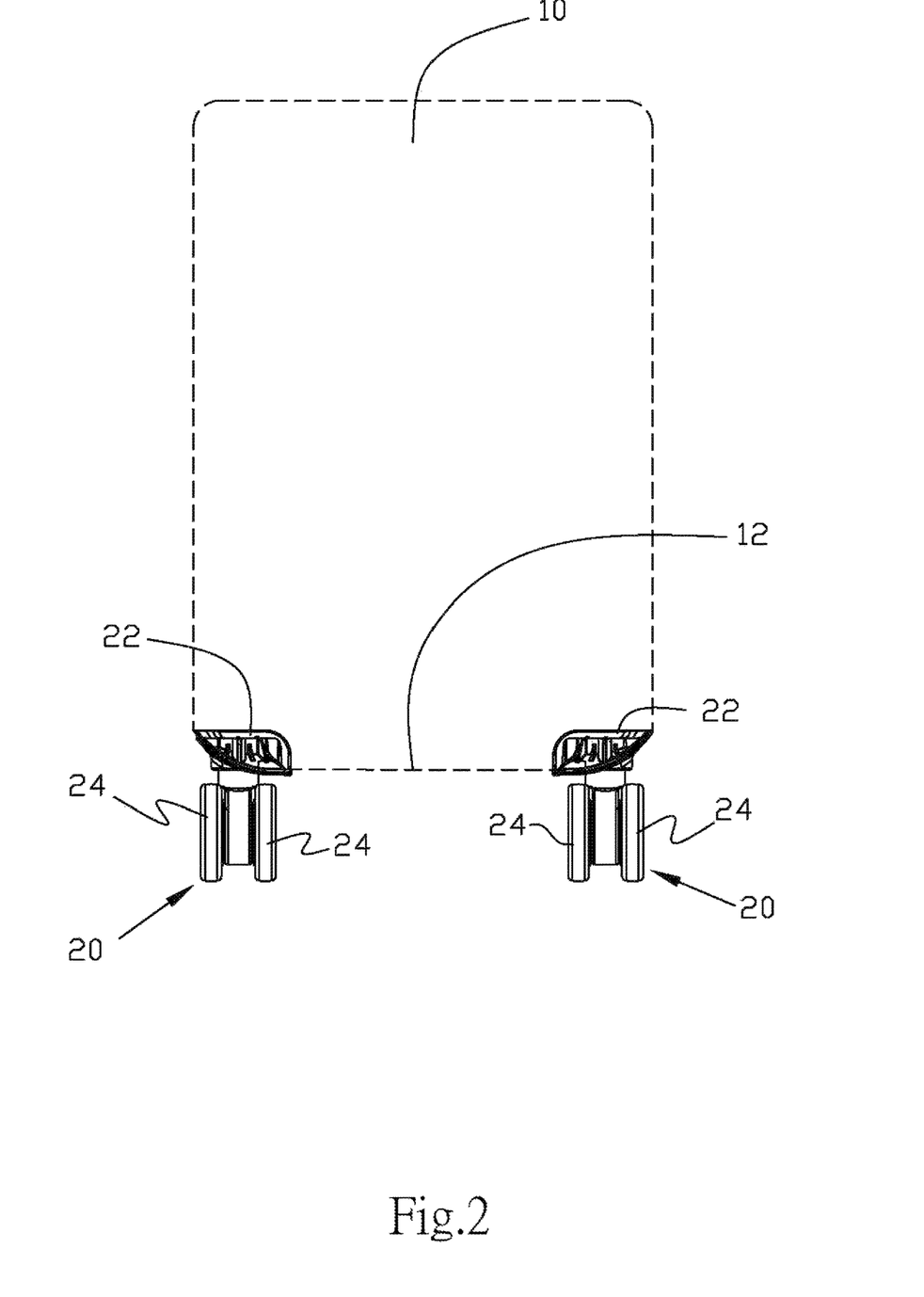
FIG. 2 is a sketch diagram of the first preferred embodiment of the present invention, showing the hollow wheel assemblies mounted on the bottom of the case.

As shown in FIG. 1, a wheel assembly 20 of the first preferred embodiment of the present invention includes a wheel mount 22 and two wheel members 24. As shown in FIG. 2, a plurality of the wheel assemblies 20 of the first preferred embodiment of the present invention are able to be mounted on a bottom 12 of a case 10 to form a luggage. In detail, the wheel mount 22 of the wheel assembly 20 is connected to the case 10, so that user may draw the luggage to walk.

Figure 3:
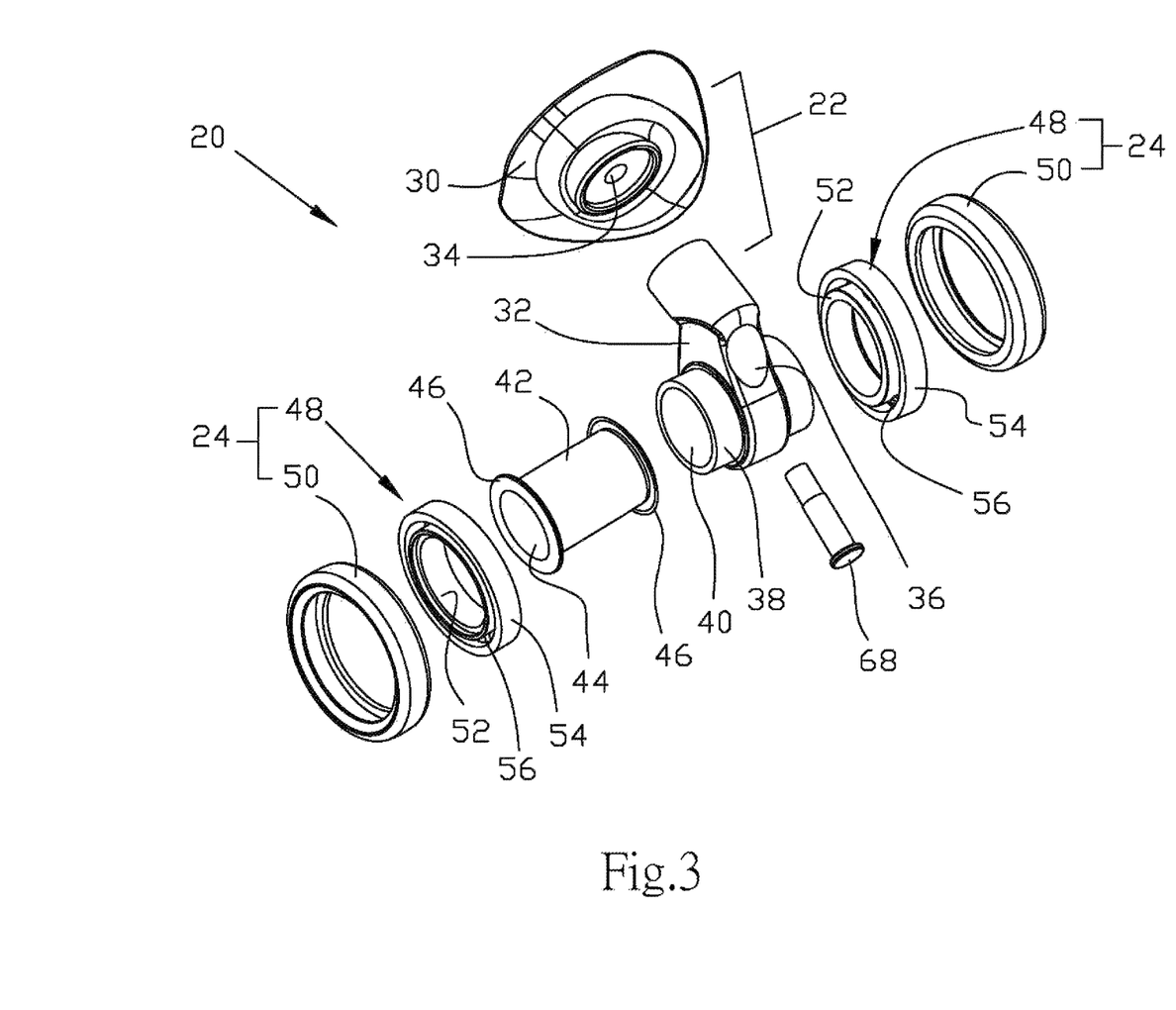
FIG. 3 is an exploded view of the first preferred embodiment of the present invention.

As shown in FIG. 3, the wheel mount 22 of the wheel assembly 20 includes a seat member 30 and an assembling member 32. The seat member 30 and the assembling member 32 could be made into a single element, or they could be two separated elements connected together as shown in drawings. The seat member 30 includes a first positioning bore 34, and the assembling member 32 has a second positioning bore 36. The seat member 30 and the assembling member 32 are mounted at the bottom 12 of the case 10. The wheel mount 22 further has a connecting member 68 inserted into the first and the second positioning bores 34, 36 for connecting the seat member 30 to the assembling member 32, and then a plurality of fasteners (not shown) are provided to fix the seat member 30 to the case 10, so that the wheel mount 22 is firmly fixed to the bottom 12 of the case 10.

The wheel mount 22 further has a shaft sleeve 38 on an end of the assembling member 32, and the shaft sleeve 38 has an assembling passage 40.

The wheel assembly 20 of the first preferred embodiment further includes a hollow shaft 42, and the hollow shaft 42 has a vision passage 44 passing through the hollow shaft in an axial direction thereof and two stop flanges 46 at opposite ends thereof.

The wheel members 24 each have an inner wheel member 48 and an outer wheel member 50. The inner wheel member 48 has an inner ring portion 52, an outer ring portion 54, and a plurality of connecting portions 56.

Figure 4:
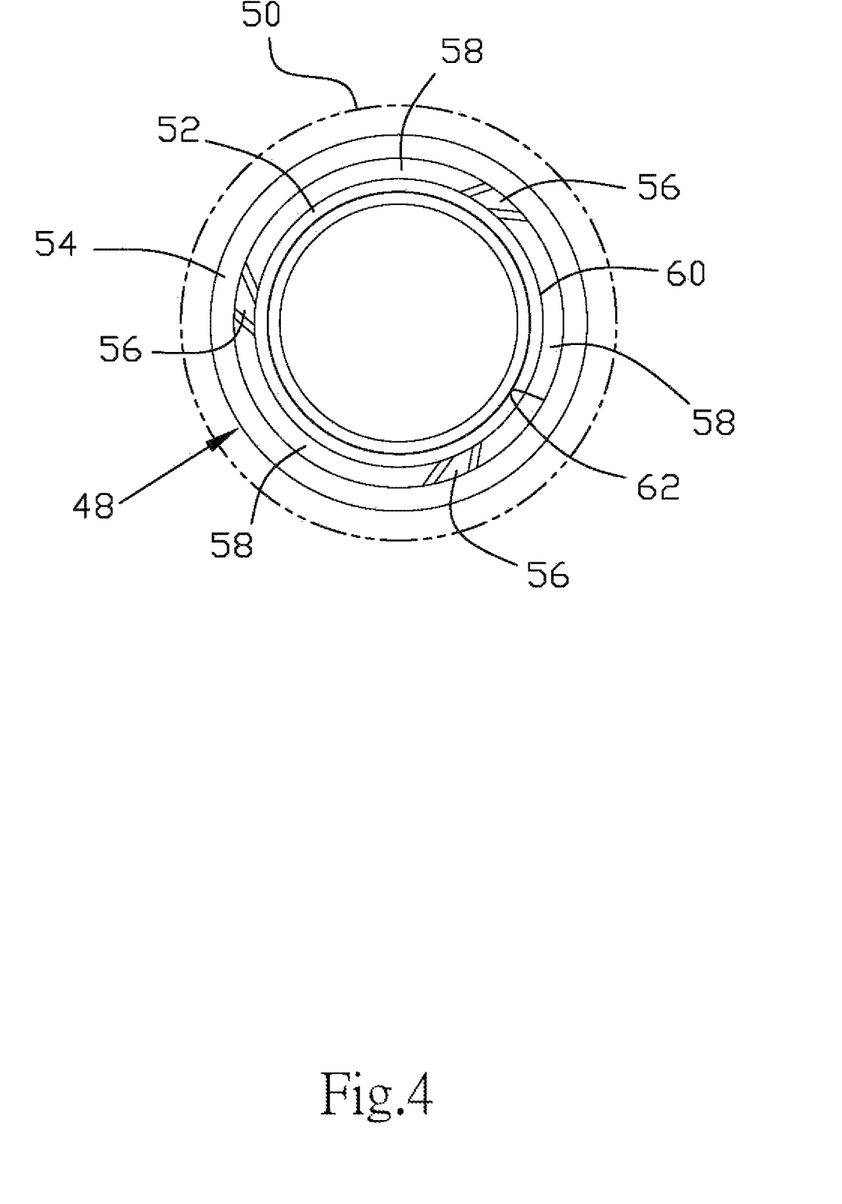
FIG. 4 is a lateral view of the inner wheel of the first preferred embodiment of the present invention.

As shown in FIG. 4, the inner ring portion 52 and the outer ring portion 54 are concentric, and the inner ring portion 52 is within the outer ring portion 54. The connecting portions 56 are between the inner ring portion 52 and the outer ring portion 54 with opposite ends connected to the inner ring portion 52 and the outer ring portion 54. As a result, a plurality of vision bores 58 are formed between the inner ring portion 52 and the outer ring portion 54 and between the neighboring connecting portions 56. The inner ring portion 52 is provided with an assembling bore 64 at a center thereof. The outer wheel member 50 is connected to the outer ring portion 54 of the inner wheel member 48.

Figure 5:
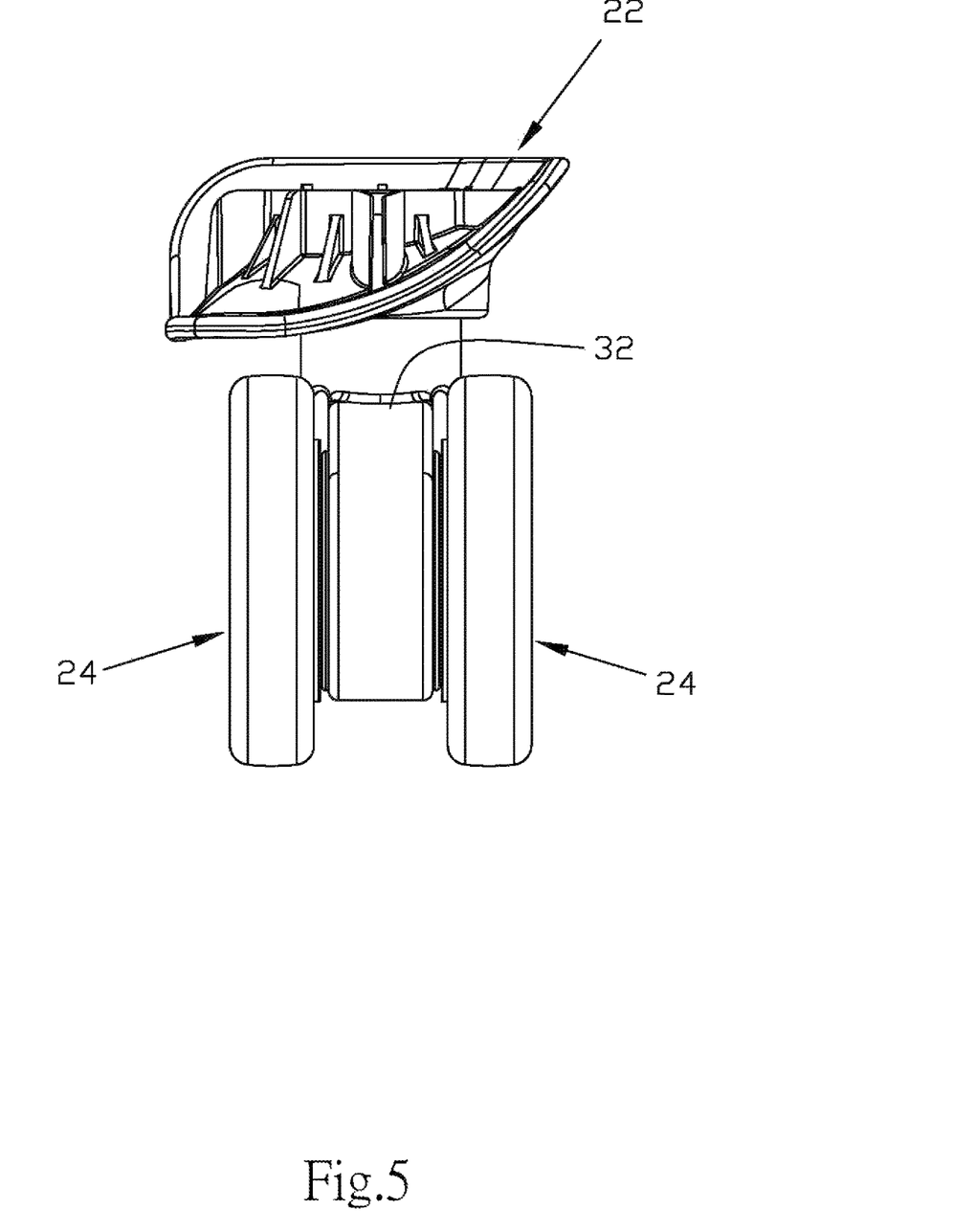
FIG. 5 is a right view of the first preferred embodiment of the present invention.
Figure 6:
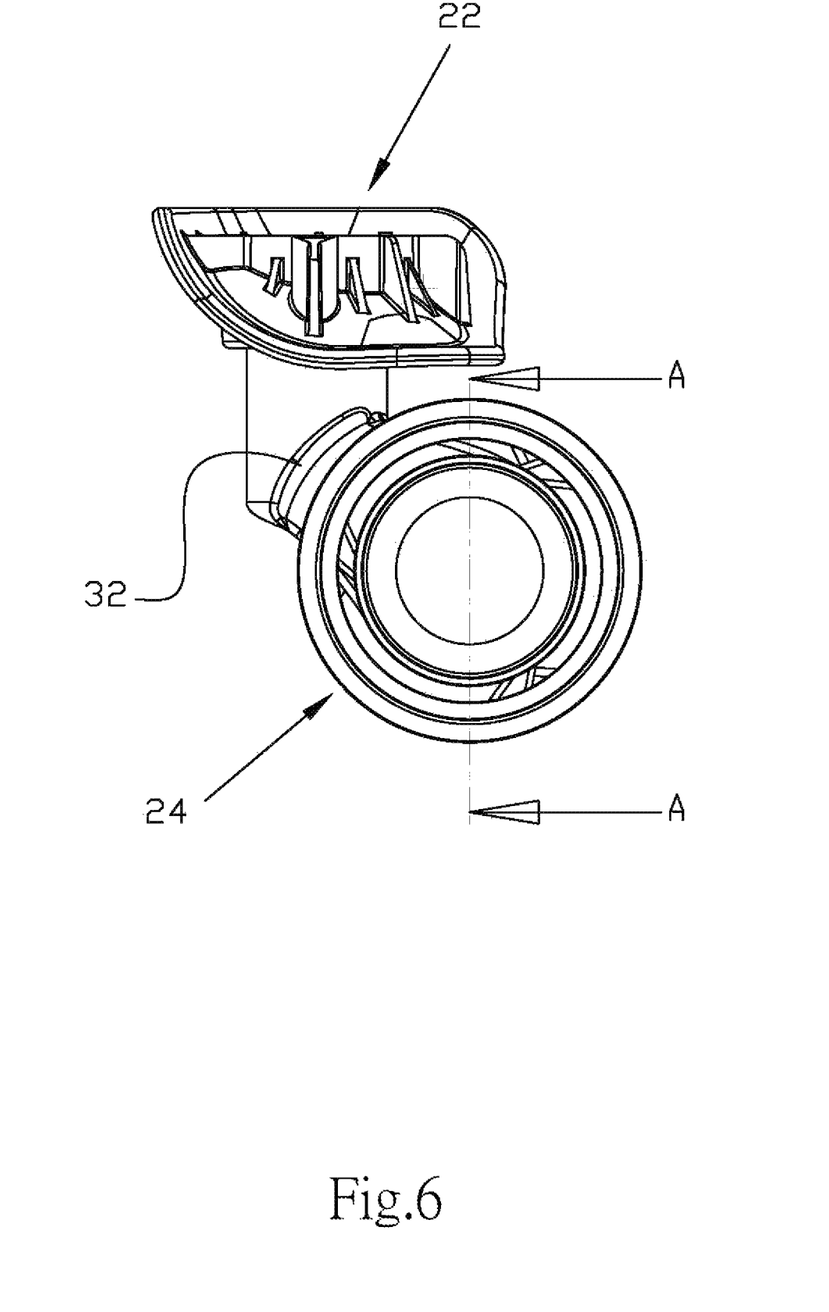
FIG. 6 is a front view of the first preferred embodiment of the present invention.

As shown in FIGS. 5 and 6, the wheel members 24 are connected to opposite sides of the wheel mount 22, and more preferable, the wheel members 24 are connected to opposite sides of the assembling member 32 of the wheel mount 22.

Figure 7:
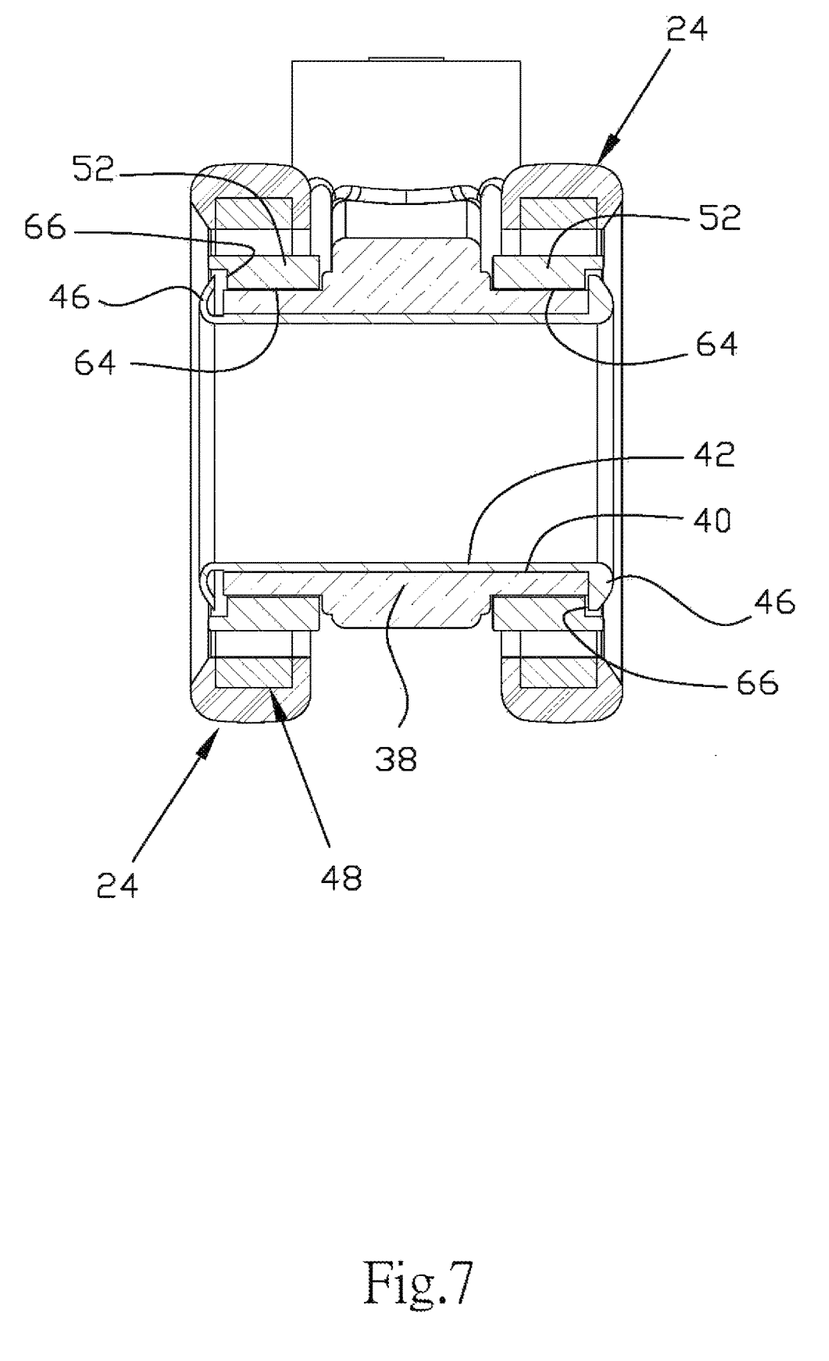
FIG. 7 is a sectional view along the A-A line of FIG. 6.

As shown in FIG. 7, the wheel members 24 are connected to opposite ends of the shaft sleeve 38. The opposite ends of the shaft sleeve 38 are inserted into the assembling bores 64 of the inner ring portions 52 respectively. The shaft sleeve 38 and the assembling member 32 could be made into a single element, so that the shaft sleeve 38 is unable to rotate to play as an axle of rotation of the hollow shaft 42. The hollow shaft 42 is inserted into the assembling passage 40 of the shaft sleeve 38 with opposite ends left out of the assembling passage 40 to be abutted against the wheel members 24, and more preferable, the opposite ends of the hollow shaft 42 are abutted against the inner ring portions 52 of the inner wheel members 48.

The stop flanges 46 are formed on the opposite ends of the hollow shaft 42, and outer diameters of the stop flanges 46 are greater than an outer diameter of the shaft sleeve 38, and smaller than inner diameters of the inner ring portions 52. Therefore, the stop flanges 46 of the hollow shaft 42 are able to prevent the wheel members 24 from escaping from the shaft sleeve 38.

The inner ring portion 52 has a shoulder portion 66 on a side thereof to be abutted against the corresponding stop flanges 46 of the hollow shaft 42 to restrict the wheel members 24.

With the structure as described above, the wheel members 24 of the wheel assembly 20 are able to rotate. People can see through the wheel members 24 via the vision bores 58 while the wheel members 24 are rotating, and so does the vision passage 44 even when the wheel members 24 are stopped.

The wheel members 24 are connected to the opposite ends of the shaft sleeve 38, so that no bearing is needed between the wheel members 24 and the wheel mount 22 that could simplify the structure of the wheel assembly 20.

Figure 8:
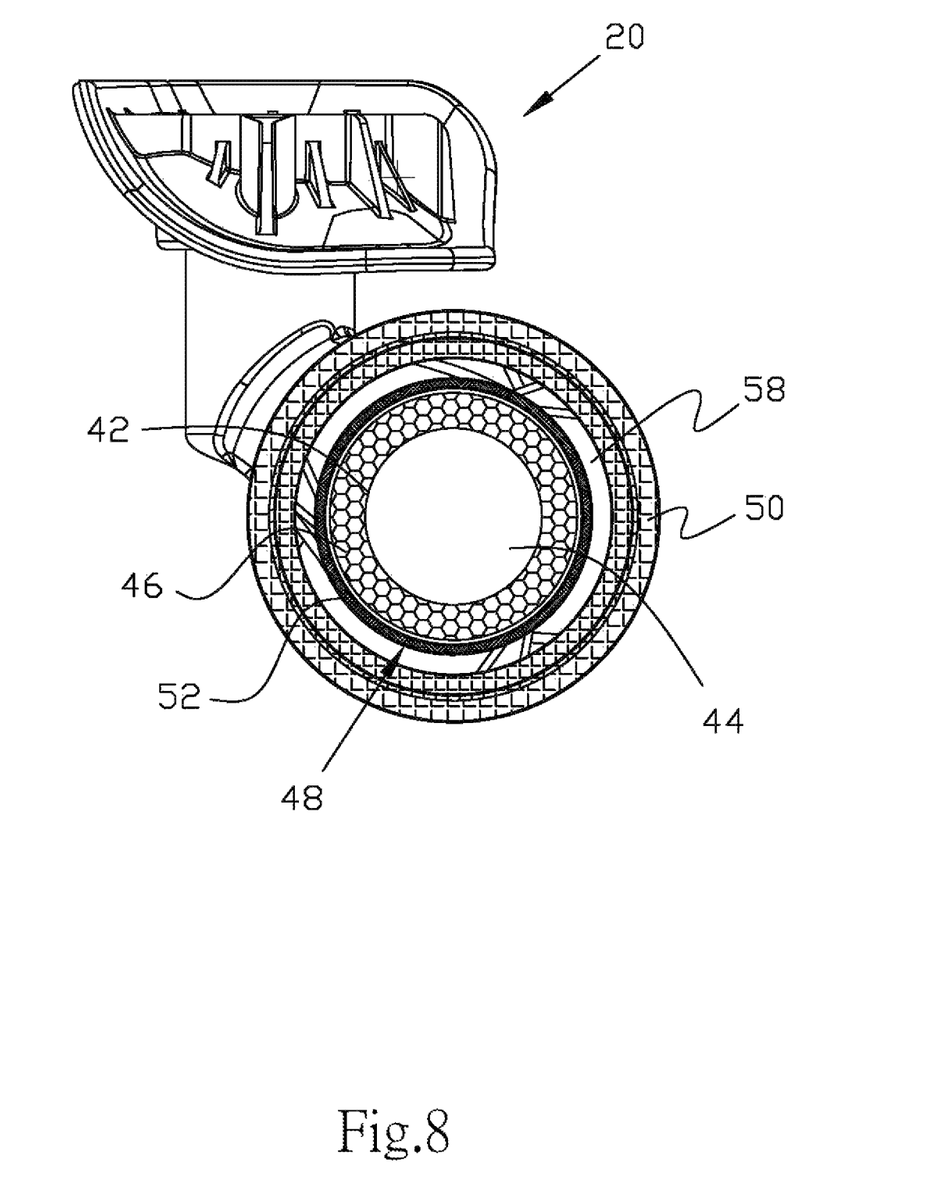
FIG. 8 is a front view of the first preferred embodiment of the present invention, showing the wheel having different colors.

As shown in FIG. 8, the inner ring portions 52 of the inner wheel members 48, the outer wheel member 50, and the hollow shaft 42 could have different colors, or be printed with different colors. It could provide various visual effects when the wheel members 24 are running.

Figure 9:
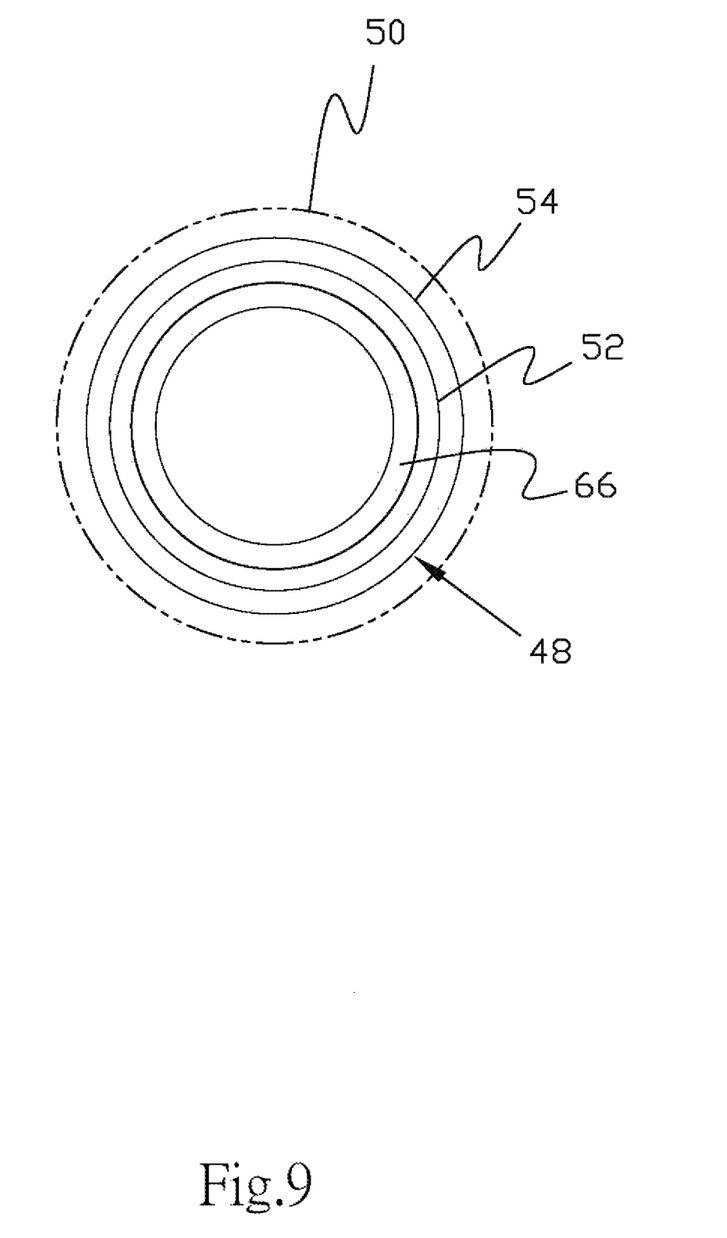
FIG. 9 is a sketch diagram of a second preferred embodiment of the present invention.
Figure 10:
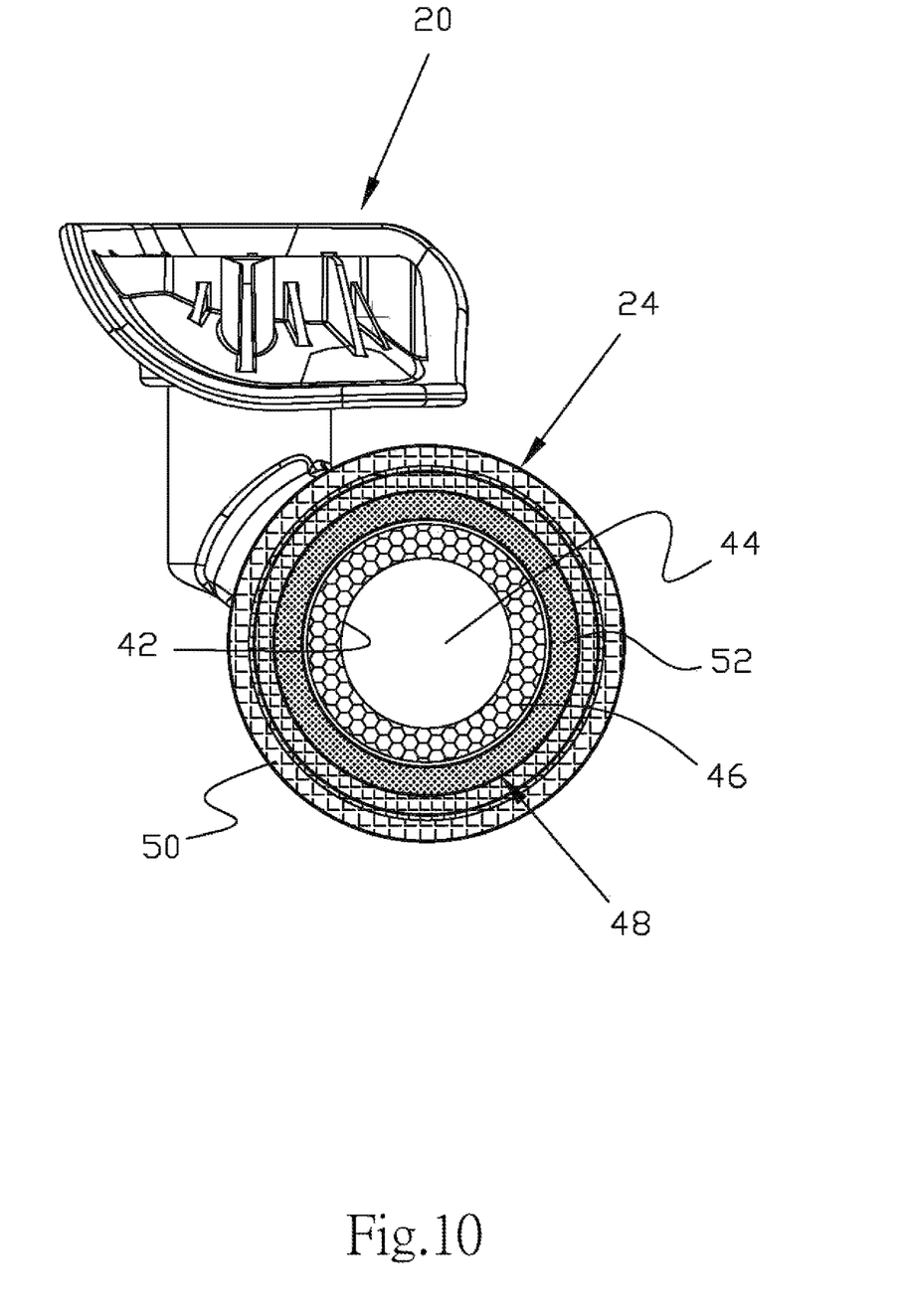
FIG. 10 is a front view of the second preferred embodiment of the present invention, showing the wheel having different colors.

As shown in FIGS. 9 and 10, the second preferred embodiment of the present invention provides the inner wheel member 48 including the inner ring portion 52 and the outer ring portion 54, and the shoulder portion 66 formed on a side of the inner ring portion 52. The inner ring portion 52 is directly connected to the outer ring portion 54 without the connecting members. The stop flange 46 of the hollow shaft 42 is abutted against the shoulder portion 66 to restrict the wheel member 24 on the hollow shaft 42, and people can see through the wheel member 24 via the vision passage 44. The same as above, the inner ring portions 52 of the inner wheel members 48, the outer wheel member 50, and the hollow shaft 42 could have different colors, or be printed with different colors. It could provide various visual effects when the wheel members 24 are running.

It must be pointed out that the embodiments described above are only some preferred embodiments of the present invention. All equivalent structures which employ the concepts disclosed in this specification and the appended claims should fall within the scope of the present invention.

What is claimed is:

1. A hollow wheel assembly, which is adapted to be mounted on a bottom of a case of a luggage, comprising:
    a wheel mount, which is adapted to be connected to the case of the luggage, including a shaft sleeve with an assembling passage;
    two wheel members connected to opposite ends of the shaft sleeve respectively for free rotation; and
    a hollow shaft inserted into the assembling passage of the shaft sleeve, and having a vision passage passing through the hollow shaft in an axial direction;
    wherein each of the wheel members includes an inner wheel member and an outer wheel member; the inner wheel member includes an inner ring portion, an outer ring portion, and a plurality of connecting portions; the inner ring portion and the outer ring portion are concentric, and the inner ring portion is within the outer ring portion; the connecting portions are between the inner ring portion and the outer ring portion with opposite ends connected to the inner ring portion and the outer ring portion, so that a plurality of vision bores are formed between the inner ring portion and the outer ring portion and between the neighboring connecting portions; the inner ring portion is provided with an assembling bore at a center thereof, and the shaft sleeve is inserted into the assembling bore; opposite ends of the hollow shaft are abutted against the inner ring portions respectively; the outer wheel members are mounted on the outer ring portions of the inner wheel members respectively, whereby one may see through the wheel members via the vision bores and the vision passages when the wheel members are rotating.

2. The hollow wheel assembly of claim 1, wherein the hollow shaft has two stop flanges at opposite ends thereof, and outer diameters of the stop flanges are greater than an outer diameter of the shaft sleeve, and smaller than inner diameters of the inner ring portions of the wheel members.

3. The hollow wheel assembly of claim 2, wherein each of the inner ring portions has a shoulder portion on a side thereof to be abutted against the corresponding stop flange of the hollow shaft to restrict the wheel members on the shaft sleeve.

4. The hollow wheel assembly of claim 1, wherein the wheel mount includes a seat member and an assembling member; the seat member and the assembling member are detachably connected together; the shaft sleeve is connected to the assembling member, and the seat member is adapted to be connected to the case of the luggage.

5. The hollow wheel assembly of claim 4, wherein the seat member includes a first positioning bore, and the assembling member has a second positioning bore; the wheel mount further has a connecting member to be inserted into the first and the second positioning bores for connecting the seat member to the assembling member.

6. The hollow wheel assembly of claim 1, wherein the inner ring portions of the inner wheel members, the outer wheel member, and the hollow shaft have different colors.

7. A hollow wheel assembly, which is adapted to be mounted on a bottom of a case of a luggage, comprising:
 a wheel mount, which is adapted to be connected to the case of the luggage, including a shaft sleeve with an assembling passage; and
 two wheel members connected to opposite ends of the shaft sleeve respectively for free rotation; and
 a hollow shaft inserted into the assembling passage of the shaft sleeve, and having a vision passage passing through the hollow shaft in an axial direction thereof;
 wherein opposite ends of the hollow shaft are abutted against the wheel members respectively, so that one may see through the wheel members via the vision passages when the wheel members are rotating;
 wherein each of the wheel members includes an inner wheel member and an outer wheel member; the inner wheel member includes an inner rind portion and an outer ring portion; the inner ring portion and the outer ring portion are concentric, and the inner ring portion is within the outer ring portion; each of the inner ring portion is provided with an assembling bore at a center thereof and a shoulder portion on a side thereof; the shaft sleeve is inserted into the assembling bore, and the stop flanges of the hollow shaft are abutted against the corresponding shoulder portions to restrict the wheel members on the shaft sleeve; the outer wheel members are mounted on the outer ring portions of the inner wheel members respectively, whereby one may see through the wheel members via the vision passages when the wheel members are rotating.

8. The hollow wheel assembly of claim 7, wherein the wheel mount of the wheel assembly includes a seat member and an assembling member; the seat member and the assembling member are detachably connected together; the shaft sleeve is connected to the assembling member, and the seat member is adapted to be connected to the case of the luggage.

9. The hollow wheel assembly of claim 8, wherein the seat member includes a first positioning bore, and the assembling member has a second positioning bore; the wheel mount further has a connecting member to be inserted into the first and the second positioning bores for connecting the seat member to the assembling member.

* * * * *